(12) United States Patent
Friedman et al.

(10) Patent No.: US 8,755,936 B2
(45) Date of Patent: Jun. 17, 2014

(54) DISTRIBUTED MULTI-ROBOT SYSTEM

(75) Inventors: Scott Justin-Marl Friedman, Pittsburgh, PA (US); Hans Peter Moravec, Pittsburgh, PA (US)

(73) Assignee: Seegrid Corporation, Pittsburgh, PA (US)

( * ) Notice: Subject to any disclaimer, the term of this patent is extended or adjusted under 35 U.S.C. 154(b) by 632 days.

(21) Appl. No.: 12/371,281

(22) Filed: Feb. 13, 2009

(65) Prior Publication Data
US 2009/0198376 A1  Aug. 6, 2009

Related U.S. Application Data

(63) Continuation-in-part of application No. 12/361,379, filed on Jan. 28, 2009, now Pat. No. 8,433,442.

(60) Provisional application No. 61/028,320, filed on Feb. 13, 2008, provisional application No. 61/024,028, filed on Jan. 28, 2008.

(51) Int. Cl.
*B25J 9/00* (2006.01)

(52) U.S. Cl.
USPC ............. 700/248; 700/249; 901/8; 718/104

(58) Field of Classification Search
USPC ........... 701/23, 200, 201, 208; 700/248, 258, 700/245, 253, 249; 901/1, 50, 17, 6, 8; 318/568.1; 718/103, 104, 102
See application file for complete search history.

(56) References Cited

U.S. PATENT DOCUMENTS

| | | | |
|---|---|---|---|
| 4,674,048 A | 6/1987 | Okumura |
| 5,032,775 A | 7/1991 | Mizuno et al. |
| 5,086,535 A | 2/1992 | Grossmeyer et al. |
| 5,369,347 A | 11/1994 | Yoo |
| 5,440,216 A | 8/1995 | Kim |
| 5,534,762 A | 7/1996 | Kim |
| 5,682,313 A | 10/1997 | Edlund et al. |
| 5,684,695 A | 11/1997 | Bauer |
| 5,867,800 A | 2/1999 | Leif |
| 6,076,025 A | 6/2000 | Ueno et al. |
| 6,124,694 A | 9/2000 | Bancroft et al. |
| 6,278,904 B1 | 8/2001 | Ishii |
| 6,374,155 B1 | 4/2002 | Wallach et al. |
| 6,389,329 B1 | 5/2002 | Colens |

(Continued)

FOREIGN PATENT DOCUMENTS

| | | |
|---|---|---|
| JP | 63-222726 | 9/1988 |
| JP | 5-143158 | 6/1993 |

(Continued)

OTHER PUBLICATIONS

Extended European Search Report dated Feb. 22, 2011 issued in corresponding European Application No. EP09706350.

(Continued)

*Primary Examiner* — Ronnie Mancho
(74) *Attorney, Agent, or Firm* — Onello & Mello, LLP

(57) ABSTRACT

A system is provided that includes at least one manager and one or more robots configured to communicate wirelessly. The manager can include certain functions that generate data, instructions, or both used by one or more robots. The manager can also facilitate communications among several robots, or robots could also be configured to communicate directly.

29 Claims, 3 Drawing Sheets

(56) References Cited

U.S. PATENT DOCUMENTS

| | | | |
|---|---|---|---|
| 6,459,955 B1 | 10/2002 | Bartsch et al. | |
| 6,496,754 B2 | 12/2002 | Song et al. | |
| 6,496,755 B2 | 12/2002 | Wallach et al. | |
| 6,532,404 B2 | 3/2003 | Colens | |
| 6,539,284 B2 | 3/2003 | Nourbakhsh et al. | |
| 6,604,022 B2 | 8/2003 | Parker et al. | |
| 6,611,120 B2 | 8/2003 | Song et al. | |
| 6,667,592 B2 | 12/2003 | Jacobs et al. | |
| 6,668,157 B1 | 12/2003 | Takeda et al. | |
| 6,728,608 B2 | 4/2004 | Ollis et al. | |
| 6,732,826 B2 | 5/2004 | Song et al. | |
| 6,760,647 B2 | 7/2004 | Nourbakhsh et al. | |
| 6,774,596 B1 | 8/2004 | Bisset | |
| 6,841,963 B2 | 1/2005 | Song et al. | |
| 6,868,307 B2 | 3/2005 | Song et al. | |
| 6,870,792 B2 | 3/2005 | Chiappetta | |
| 6,879,878 B2 | 4/2005 | Glenn et al. | |
| 6,883,201 B2 | 4/2005 | Jones et al. | |
| 6,925,679 B2 | 8/2005 | Wallach et al. | |
| 6,957,712 B2 | 10/2005 | Song et al. | |
| 6,968,592 B2 | 11/2005 | Takeuchi et al. | |
| 6,984,952 B2 | 1/2006 | Peless et al. | |
| 7,024,278 B2 | 4/2006 | Chiappetta et al. | |
| 7,155,308 B2 | 12/2006 | Jones | |
| 7,162,056 B2 | 1/2007 | Burl et al. | |
| 7,167,775 B2 | 1/2007 | Abramson et al. | |
| 7,188,000 B2 | 3/2007 | Chiappetta et al. | |
| 7,206,677 B2 | 4/2007 | Hulden | |
| 7,251,548 B2 | 7/2007 | Herz et al. | |
| 7,446,766 B2 | 11/2008 | Moravec | |
| 7,447,593 B2 | 11/2008 | Estkowski et al. | |
| 7,507,948 B2 | 3/2009 | Park et al. | |
| 7,526,362 B2 | 4/2009 | Kim et al. | |
| 7,720,572 B2 * | 5/2010 | Ziegler et al. | 700/245 |
| 7,805,220 B2 | 9/2010 | Taylor et al. | |
| 7,835,821 B2 * | 11/2010 | Roh et al. | 700/245 |
| 2002/0095239 A1 | 7/2002 | Wallach et al. | |
| 2002/0138936 A1 | 10/2002 | Takeuchi et al. | |
| 2002/0153184 A1 | 10/2002 | Song et al. | |
| 2003/0025472 A1 | 2/2003 | Jones et al. | |
| 2003/0028286 A1 | 2/2003 | Glenn et al. | |
| 2003/0212472 A1 | 11/2003 | McKee | |
| 2004/0030571 A1 | 2/2004 | Solomon | |
| 2004/0073337 A1 | 4/2004 | McKee et al. | |
| 2004/0076324 A1 | 4/2004 | Burl et al. | |
| 2004/0083570 A1 | 5/2004 | Song et al. | |
| 2004/0167716 A1 | 8/2004 | Goncalves et al. | |
| 2004/0168148 A1 | 8/2004 | Goncalves et al. | |
| 2004/0204792 A1 | 10/2004 | Taylor et al. | |
| 2004/0207355 A1 | 10/2004 | Jones et al. | |
| 2005/0000543 A1 | 1/2005 | Taylor et al. | |
| 2005/0067994 A1 | 3/2005 | Jones et al. | |
| 2005/0080514 A1 * | 4/2005 | Omote et al. | 700/253 |
| 2005/0134209 A1 | 6/2005 | Kim | |
| 2005/0216126 A1 | 9/2005 | Koselka et al. | |
| 2005/0273226 A1 | 12/2005 | Tani | |
| 2005/0273967 A1 | 12/2005 | Taylor et al. | |
| 2005/0287038 A1 | 12/2005 | Dubrovsky et al. | |
| 2005/0288079 A1 | 12/2005 | Tani | |
| 2006/0020369 A1 | 1/2006 | Taylor et al. | |
| 2006/0038521 A1 | 2/2006 | Jones et al. | |
| 2006/0060216 A1 | 3/2006 | Woo | |
| 2006/0061476 A1 | 3/2006 | Patil et al. | |
| 2006/0095158 A1 | 5/2006 | Lee et al. | |
| 2006/0178777 A1 | 8/2006 | Park et al. | |
| 2006/0293788 A1 | 12/2006 | Pogodin | |
| 2007/0042716 A1 | 2/2007 | Goodall et al. | |
| 2007/0135962 A1 * | 6/2007 | Kawabe et al. | 700/225 |
| 2007/0192910 A1 | 8/2007 | Vu et al. | |
| 2007/0199108 A1 * | 8/2007 | Angle et al. | 901/17 |
| 2007/0244610 A1 | 10/2007 | Ozick et al. | |
| 2007/0267570 A1 | 11/2007 | Park et al. | |
| 2008/0004904 A1 * | 1/2008 | Tran | 705/2 |
| 2008/0056933 A1 | 3/2008 | Moore et al. | |
| 2008/0086236 A1 * | 4/2008 | Saito et al. | 700/245 |
| 2008/0109114 A1 * | 5/2008 | Orita et al. | 700/248 |
| 2008/0184518 A1 | 8/2008 | Taylor et al. | |

FOREIGN PATENT DOCUMENTS

| | | |
|---|---|---|
| JP | 6-314124 | 11/1994 |
| JP | 9-90026 | 4/1997 |
| JP | 11-104984 | 4/1999 |
| JP | 11-104984 A | 4/1999 |
| JP | 2000-339028 | 12/2000 |
| JP | 2000-342498 | 12/2000 |
| JP | 2001-67124 | 3/2001 |
| JP | 2001-246580 | 9/2001 |
| JP | 2001-300874 | 10/2001 |
| JP | 2002-85305 | 3/2002 |
| JP | 2002-254374 A | 9/2002 |
| JP | 2002-325708 | 11/2002 |
| JP | 2002-351305 | 12/2002 |
| JP | 2003-515210 A | 4/2003 |
| JP | 2003-515801 | 5/2003 |
| JP | 2003180587 | 7/2003 |
| JP | 2003-225184 | 8/2003 |
| JP | 2003256043 | 9/2003 |
| JP | 2004-33340 | 2/2004 |
| JP | 2004-97439 | 4/2004 |
| JP | 2004-097439 A | 4/2004 |
| JP | 2004-148090 | 5/2004 |
| JP | 2005-111603 A | 4/2005 |
| JP | 2005-124753 | 5/2005 |
| JP | 2005-219161 | 8/2005 |
| JP | 2005205028 | 8/2005 |
| JP | 2006-007368 A | 1/2006 |
| JP | 2006-087918 A | 4/2006 |
| JP | 2006-102861 A | 4/2006 |
| JP | 2006-218005 | 8/2006 |
| JP | 2006-252273 | 9/2006 |
| JP | 2006331054 | 12/2006 |
| JP | 2007-4527 | 1/2007 |
| JP | 2007-309921 | 11/2007 |
| JP | 2008-3979 | 1/2008 |
| KR | 10-2002-0076153 A | 10/2002 |
| KR | 10-2002-0081035 A | 10/2002 |
| KR | 10-2002-0088880 A | 11/2002 |
| KR | 10-0645818 B1 | 11/2006 |
| WO | 01/37060 | 5/2001 |
| WO | 0137060 A1 | 5/2001 |
| WO | 0138945 | 5/2001 |
| WO | 2007/051972 | 5/2007 |

OTHER PUBLICATIONS

Extended European Search Report dated Mar. 7, 2011 issued in corresponding European Application No. EP09705670.

Extended European Search Report dated Mar. 8, 2011 issued in corresponding European Application No. EP09706723.

Bennewitz, et al., "Adapting Navigation Strategies Using Motions Patterns of People," 2003, Proceedings of the 2003 IEEE International Conference on Robotics & Automation, pp. 2000-2005.

Alami, et al., "Diligent: Towards a Human-Friendly Navigation System," 2000, Proceedings of the 2000 IEEE/RSJ International Conference on Intelligent Robots and Systems, pp. 21-26.

Lee, et al., "An Agent for Intelligent Spaces: Functions and Roles of Mobile Robots in Sensored, Networked and Thinking Spaces," 1997, IEEE Conference on Intelligent Transportation System (ITSC '97), pp. 983-988.

International Search Report dated Aug. 31, 2009 issued in corresponding International Application No. PCT/US2009/032274.

International Search Report dated Sep. 14, 2009 issued in corresponding International Application No. PCT/US2009/032243.

International Search Report dated Sep. 14, 2009 issued in corresponding International Application No. PCT/US2009/032245.

International Search Report dated Sep. 30, 2009 issued in corresponding International Application No. PCT/US2009/034081.

Office Action dated Jan. 22, 2013 issued in corresponding Japanese Application No. 2010-545106.

(56) References Cited

OTHER PUBLICATIONS

Office Action dated Apr. 2, 2013 issued in related Japanese Application No. 2010-546923.
Office Action dated Feb. 19, 2013 issued in related Japanese Application No. 2010-545107.

Extended European Search Report dated Sep. 12, 2013 issued on corresponding European Application No. 09710577.9.

Japanese Office Action dated Nov. 5, 2013 issued in corresponding Japanese Application No. 2010-545107.

* cited by examiner ved is a robot system architecture, design, and method that
DISTRIBUTED MULTI-ROBOT SYSTEM

CROSS REFERENCE TO RELATED APPLICATIONS

This application claims the benefit, under 35 U.S.C. §119 (e), of U.S. Provisional Patent Application No. 61/028,320 filed Feb. 13, 2008. This application is also a continuation-in-part application of U.S. Non-provisional patent application Ser. No. 12/361,379 filed Jan. 28, 2009, which claimed the benefit of U.S. Provisional Patent Application No. 61/024,028 filed Jan. 28, 2008, which are incorporated herein by reference.

This application may be related to U.S. Non-provisional Application No. filed Jan. 28, 2009 and U.S. Non-provisional application Ser. No. 12/361,300 filed Jan. 28, 2009.

FIELD OF INTEREST

The present inventive concepts relate to designs, architectures, functions, and methods for robot systems having more than one robot, and in particular to systems and methods where communication with and among the robots is possible.

BACKGROUND

Traditionally, the architecture for consumer service robots has consisted of a machine that includes all the physical actuators needed for the service tasks, as well as all the perception and computation systems needed to perform the service task. This has resulted in service robots with severe cost and functionality restrictions. Moreover, it has resulted in severe design restrictions, with each robot needing to serve the same function competently within a wide array of facility environments.

In that regard, the robots tended to be singular in purpose and autonomous—in that they do not tend to interact in any service-oriented manner. A service robot could be introduced into a home, for example, and would service the home according to the robot's on-board preset algorithms. To the extent the robot had any real-time adaptability capability, it tended to be limited to object detection and avoidance.

SUMMARY OF INVENTION

In accordance with aspects of the present invention, provided is a robot system architecture, design, and method that enable the creation and use of service robots that are much simpler than those typically used. To achieve this, many on-board robot functions can be provided as a shared, central resource for any number of robots performing functions either serially or simultaneously in a facility.

A system can be provided that includes at least one manager and plural robots configured to communicate wirelessly. The manager can include certain functions that generate data, instructions, or both used by one or more robots. The manager can also facilitate communications among several robots, or robots could also be configured to communicate directly.

In accordance with one aspect of the invention, provided is a distributed multi-robot system. The system includes: a robot manager having a wireless communication module that transmits and receives robot information; and a plurality of robots, each having a wireless communication module configured to communicate with the robot manager in conjunction with performance of a robot service function.

The robot manager can include a mapping and navigation module configured to generate and update a map of an environment within which the plurality of robots operate.

The mapping and navigation module can be configured to track movement of the plurality of robots within the environment.

The mapping and navigation module can be configured to provide information and data to at least one robot that is used by the robot to navigate within the environment.

The robot manager can be configured to use information provided by at least one of the plurality of robots to generate and update the map of the environment.

The robot manager be configured to use information provided by a wireless transceiver to generate and update the map of the environment.

The map of the environment can include a map of at least one of an office building; a warehouse; a shopping mall, a residential complex, and a house.

The robot manager and the plurality of robots can each include a Bluetooth communication subsystem.

The robot manager can further include an Internet communication subsystem configured to enable the robot manager to communicate with remote systems.

The robot manager can further include an application framework configured to download software from a remote system and to update the robot manager using the downloaded software.

The robot manager can further include an application framework configured to download software from a remote system and to provide enhanced or different functions to one or more of the plurality of robots using the downloaded software.

Multiple robots can be configured to share the same information stored at the robot manager.

Multiple robots can be configured to update similar information stored at the robot manager.

The robot manager can further comprise a scheduler configured to schedule operations of at least one robot from the plurality of robots.

At least two robots from the plurality of robots can be configured to communicate with each other.

The at least two robots can be configured to communicate with each other through the robot manager.

The plurality of robots can include at least one of a cleaning robot, a security robot, and an entertainment robot.

In accordance with another aspect of the invention, provided is a distributed multi-robot system. The system includes: a robot manager having a wireless communication module that transmits and receives robot information; and a plurality of robots, each having a wireless communication module configured to communicate with the robot manager in conjunction with performance of a robot service function. The robot manager includes: a mapping and navigation module configured to generate and update a map of an environment within which the plurality of robots operate; an Internet communication subsystem configured to receive information and data used to monitor and control the plurality of robots; and an application framework configured to download software from a remote system and to update the robot manager using the downloaded software and to download to provide enhanced or different functions to one or more of the plurality of robots using the downloaded software.

In accordance with another aspect of the invention, provided is a method of controlling a plurality of robots in an environment. The method can comprise: providing a robot manager having a wireless communication module that transmits and receives robot information; and the robot manager communicating with each of a plurality of robots within the environment in conjunction with performance of a robot service function.

The method can further include generating and updating a map of the environment within which the plurality of robots operate.

The method can further include navigating at least one of the plurality of robots through the environment using the map.

The method can further include scheduling operations of at least one robot from the plurality of robots using the robot manager.

The method can further include downloading software from a remote system via the Internet and updating the robot manager using the downloaded software.

The method can further include downloading software from a remote system via the Internet and providing enhanced or different functions to one or more of the plurality of robots using the downloaded software.

The method can further include multiple robots sharing the same information stored at the robot manager.

The method can further include multiple robots updating similar information stored at the robot manager.

The method can further include at least two robots from the plurality of robots communicating with each other.

The at least two robots can communicate with each other through the robot manager.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENT

Figure 1:
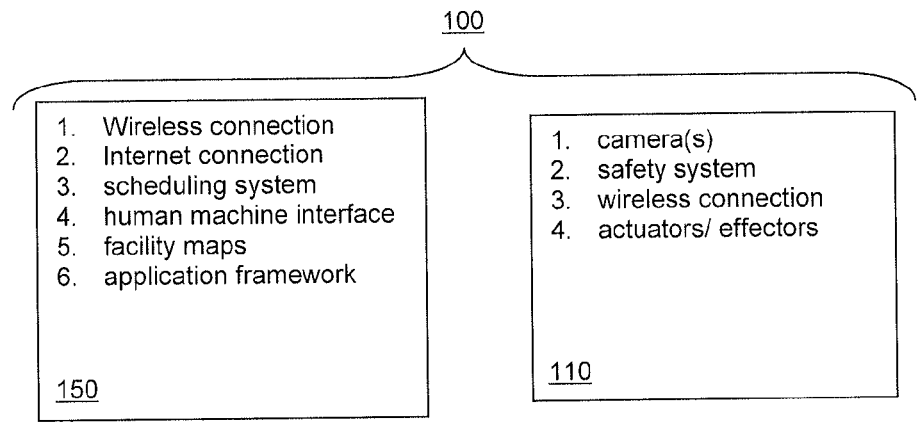
FIG. 1 is an embodiment of a system architecture having functionality distributed across a robot and a robot manager.

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

In the preferred embodiment the system can include one or more robots, and one or more robot managers, e.g., servers. The number of servers will be much fewer than the number of robots in the preferred embodiment.

FIG. 1 is an embodiment of a system architecture 100 wherein functionality is distributed across one or more robots 110 and at least one remote robot manager 150. As per FIG. 1, the robot manager 150 can be configured to provide different classes of functions for the robots 110. As examples, such classes of functions can include, but are not limited to:

1. A wireless connection to connect to the robots as well as other wireless enabled devices and Internet gateways in the facility;
2. Internet connection capability, which can be a wired or wireless connection;
3. A scheduling system to schedule robot activity, e.g., to coordinate the activity of multiple robots, and/or to coordinate the scheduling of the robots with the human occupants of the facility;
4. A human machine interface that provides a high functionality and high performance interface where the occupants can interact, program, schedule and otherwise interface to the service robots;
5. Mapping and navigation functions;
6. A monitoring module that monitors the robots activity and/or performance; and
7. An application framework, whereby additional software or other content (e.g., information and data) can be downloaded from a remote manager to update the system, or to provide enhanced or different functions.

Further the service robots 110 can include one or more functional devices, mechanisms, systems, or subsystems. These will tend to depend on the types of services or functions that robot is configured to perform. In some embodiment, these can include one or more of:

1. Cameras, either monocular or stereo;
2. Safety systems, including detectors of various types;
3. Wireless connection to the robot manager and/or to each other; and
4. Actuators and effectors.

As will be appreciated by those skilled in the art, the actual functional devices, mechanisms, systems, and subsystems included in or with a robot will depend on the functional expectations for the robot.

Figure 2:
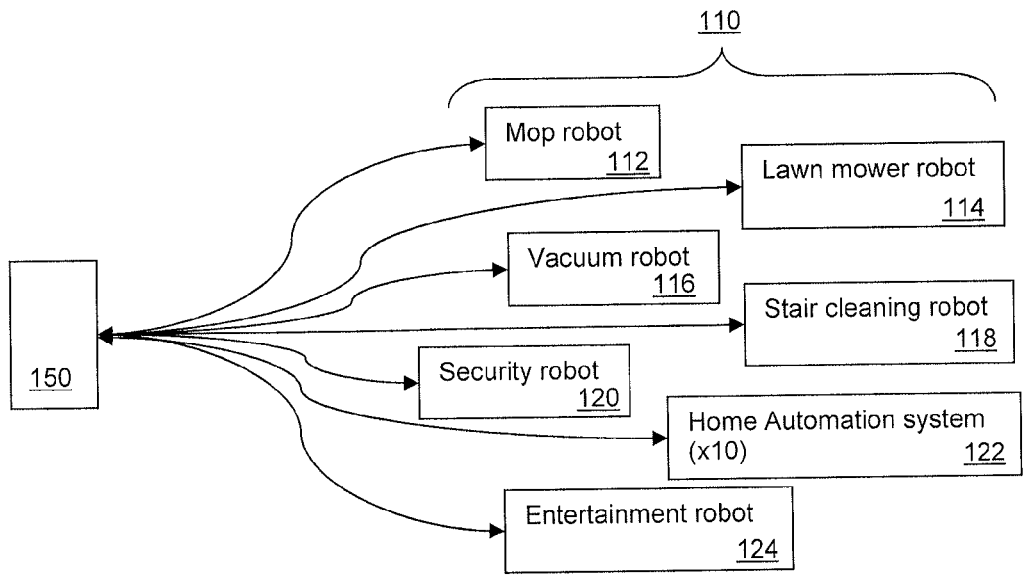
FIG. 2 shows an embodiment of a system design, whereby the robot manager can support the functionality of several different kinds of service robots.

FIG. 2 shows an embodiment of a system design, whereby the robot manager 150 can support the functionality of several different kinds of service robots 110. Here the services include a mop robot 112, a lawn mower robot 114, a vacuuming robot 116, a stair cleaning robot 118, a security robot 120, a home automation robot 122, and/or an entertainment robot 124.

The communication between the robot manager 150 and one or more robots 110 can be via any one or more known, or hereafter developed, wireless networks, and can also include one or more wired networks. For example, such networks can include a Bluetooth network, satellite network, cell phone network, wireless modem or home network, and the like. The manager can be, for example, local to one or more of the robots or remote. As an example, robots can communicate with one or more robot managers over the Internet via a wireless modem attached to a manager or personal computer within a user's home or within a commercial facility.

Each manager and robot can include at least one processor and at least one data storage device configured to store information and computer instructions.

Figure 3:
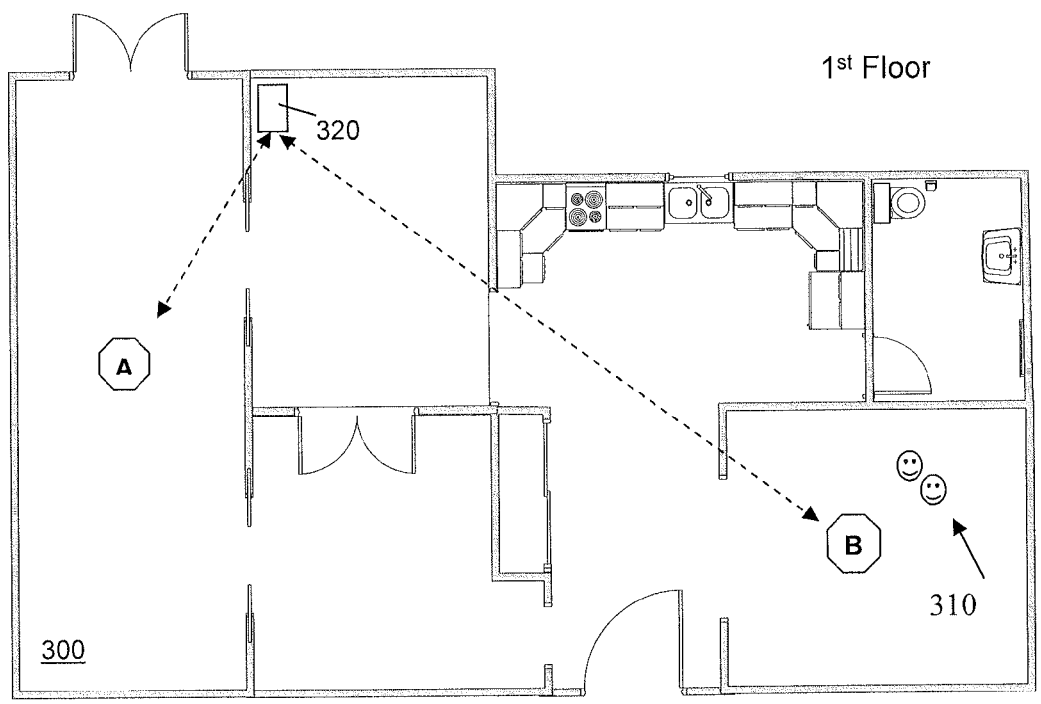
FIG. 3 shows an example of a floor plan of a home using an embodiment of a distributed multi-robot system in accordance with aspects of the present invention.

FIG. 3 shows an embodiment of a distributed multi-robot system used in a facility, in accordance with aspects of the present invention. Here that facility is a home, represented by floor plan 300. Two different robots, robots A and B, and one robot manager 320, such as a server or properly equipped personal computer, is shown in FIG. 3 and discussed below.

Robot A is a floor cleaning robot designed to navigate throughout home 300 while vacuuming floors and avoiding obstacles. Robot B is child care robot, designed to monitor the location and activities of children 310, and to provide entertainment options. The manager 320 is in communications with both robots A, B and with the Internet, in this embodiment.

Traditionally home cleaning robots navigate by following curved paths until encountering an obstacle, and then changing direction. By randomly walking the environment, they eventually clean the whole area. This is because of the power and size limitations which make it prohibitive to include complex mapping functionality on the robot.

Traditional home entertainment robots are little more than computers on wheels that can be programmed to perform simple motions while playing pre-recorded behaviors. Again this is because of the limitations of including rich functionality in low cost mobile platform.

Minimizing energy consumption is a key design objective when developing mobile platforms. Removing the need for intense computational power from a mobile platform allows for longer battery life, lower cost and lighter weight.

The robot manager 320 is a stationary device "plugged into" the wall, in this embodiment. This would allow manager 320 to be manufactured using traditional computer hardware designs, which allow for low cost and high performance. However, the computer itself would have to be configured and/or programmed to provide the unique functionality disclosed herein. Any functionality that does not control the most primitive functionality of the mobile robot could be assigned to the robot manager 320. Therefore, the robots can be configured to be extremely sophisticated in their functionality, without requiring the robot itself to have a wealth of sophisticated programming resident or on-board. This allows for lower cost robots, configurable through the manager 320.

Robot A, the floor cleaning robot, could navigate through the environment using its normal simplistic strategy the first time it operates in the environment. It would periodically update the manager with its position (determined in a variety of ways, e.g., dead-reckoning or other localization techniques) and the presence or absence of obstructions. The manager 320 could consolidate this information into a map of the environment. The next time the cleaning robot A is operated, it could now be commanded by the home manager 320 to follow a more efficient, planned route, determined by the manager 320. This provides a more efficient cleaning function, without making the robot more complex.

Furthermore, the map developed on the manager 320 could also be used to guide the operation of the child-care robot B. The robots would both be able to update the manager 320 of the whereabouts of obstacles and/or children 310, which would immediately allow the maps to be updated and allow more effective use of the cleaning robot A. If the children wanted to play an interactive game with the robot B, robot B could have access to all of the information available on the Internet, and to speech recognition and synthesis capabilities running on the manager 320, again, without increasing the power consumption of the robot B.

Figure 4:
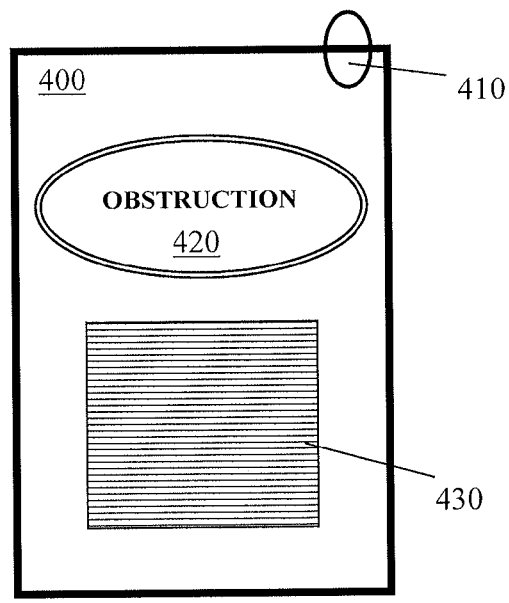
FIG. 4 is an embodiment of a transceiver that could be used to communicate location and/or obstruction information to a distributed multi-robot system in accordance with aspects of the present invention.

As is shown in FIG. 4, in another embodiment, a user-worn transceiver or transponder 400 could be used to create a map of the environment, e.g., in the form of a bracelet or belt-clip device—as examples. The transceiver 400 could also be used to provide instructions to the robot manager, or to at least one robot via the robot manager. The transceiver 400 is equipped with a wireless communication device 410 configured to communicate with manager 320, in this embodiment. As one or more users walks through the home 300, the transceiver 400 could provide location information to the robot manager 320, which could then create and/or update a map of the home. Optionally, the transceiver could have a button 420 on it, depression of which could cause a signal to be sent to the manager 320 indicating the presence of an obstruction, e.g., table.

The transceiver 400 could also optionally include a microphone 430 to receive information from the user. For example, the user could push the obstruction button 420 when he reaches a table and say "permanent" to indicate to the manager that the obstruction is intended to persist in that location. As another example, the user could push the obstruction button 420 and say "table" to indicate to the manager 320 that the obstruction is a table. The manager 320 can process the input and indicate in its map that the obstruction is "permanent" or a "table." As will be appreciated by those skilled in the art, the transceiver of FIG. 4 is not limited to the particular embodiment shown. In other embodiments, the obstruction button could just be a communication enabling button, that enables the user to communicate verbally with the robot manager. Various other forms of non-verbal communication could also be supported.

In yet another embodiment, a user can control and monitor its robots A, B from remote locations via manager 320. In such an embodiment, the user could access such robot information from a Web site that communicates with manager 320, which in turn communicates with robots A, B.

Figure 5:
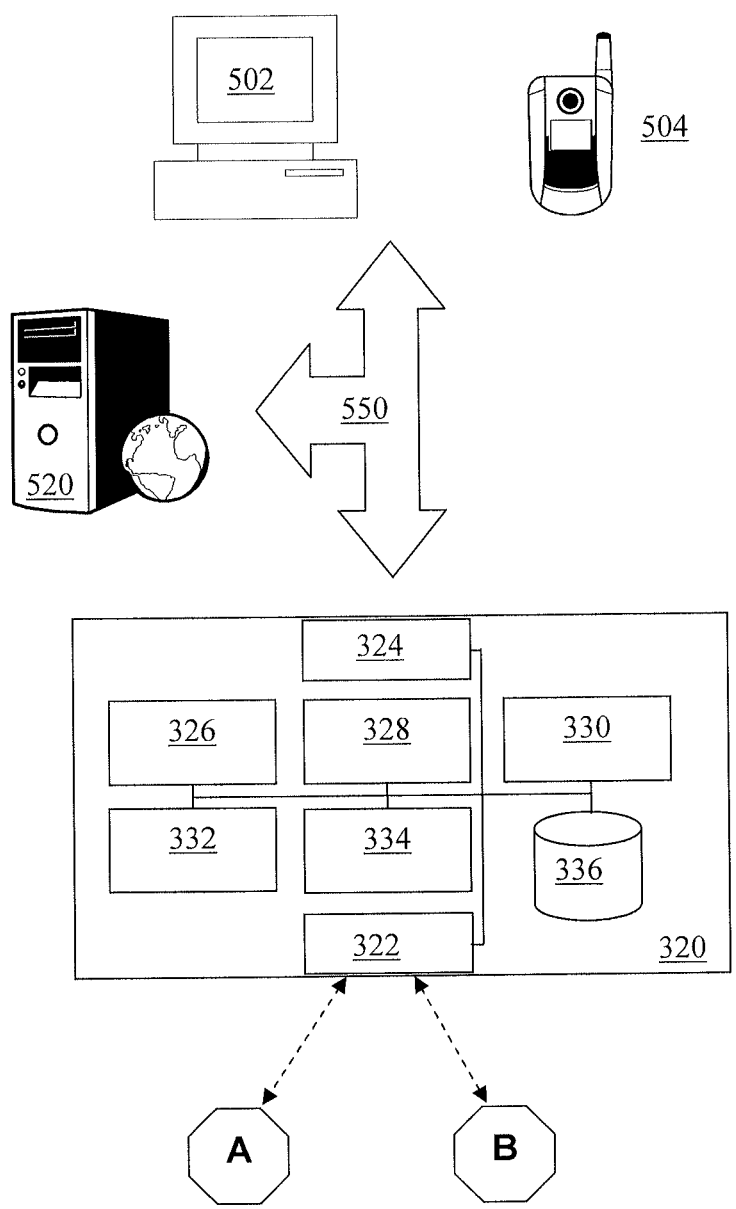
FIG. 5 shows an embodiment of a remotely accessible distributed multi-robot system in accordance with aspects of the present invention.

FIG. 5 shows an embodiment of a remotely accessed distributed multi-robot system in accordance with aspects of the present invention. In this embodiment, a user operating a personal computer (or the like) 502 or a mobile device 504 (e.g., cell phone or personal digital assistant) can access a Web based system 520, via the World Wide Web 550 (or Internet), to monitor and/or control robots A, B through robot manager 320.

Here, robot manager 320 is shown including the following functional modules: a wireless communication module 322 used to connect to the robots as well as other wireless enabled devices and Internet gateways in the facility; an Internet connection module 324, which can be a wired or wireless connection; a scheduling system 326 used to schedule robot activity, e.g., to coordinate the activity of multiple robots, and/or to coordinate the scheduling of the robots with the human occupants of the facility; a human machine interface 328 that provides a high functionality and high performance interface where the occupants can interact, program, schedule and otherwise interface to the service robots; a mapping and navigation module 330; a monitoring module 334 that monitors the robots activity and/or performance; and an application framework 334, whereby additional software can be downloaded from a remote manager to update the system, or to provide enhanced or different functions. Manager 320 also includes at least one storage device 336 configured to store maps, as well as other program code and data useful or needed to support other functions of the manager 320 and/or robots A, B.

In this embodiment, a remote user could wake-up cleaning robot A and have it vacuum the house, e.g., before the user got home. The user could also watch the robot navigate through the house via the rendering of a computer screen that includes a representation similar to that shown in FIG. 3. The present invention is not limited in this sense, this example is provided merely for illustration.

Since the robot manger 320 is in communication with robots A, B computationally intensive functions can be done primarily by server 320 rather than at the robots A, B. The manger 320 can then communicate the results of the computationally intensive functions, or instructions based thereon, to the appropriate robot A, B. This allows for highly capable, yet relatively simple and low cost robots.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein.

What is claimed is:

1. A distributed multi-robot system, comprising:
a plurality of robots configured to service an environment, each robot having a wireless communication module configured to wirelessly communicate location and object information within the environment; and
a robot manager comprising a processor, a database, and a wireless communication module configured to communicate with the plurality of robots, the robot manager configured to:
automatically update an electronic map of the environment from location and object information received from one or more of the plurality of robots during performance of one or more service function and to wirelessly communicate the updated electronic map to the plurality of robots; and
perform computationally intensive processing on behalf of a robot and wirelessly communicate the results and/or instructions therefrom to the robot for use in performance of a service function, wherein the processing required for performance of the service function is shared between the robot and the robot manager.

2. The system of claim 1, wherein the mapping and navigation module is further configured to generate the map of the environment within which the plurality of robots operate.

3. The system of claim 2, wherein the mapping and navigation module tracks movement of the plurality of robots within the environment.

4. The system of claim 2, wherein the mapping and navigation module provides information and data to at least one robot that is used by the at least one robot to navigate within the environment.

5. The system of claim 1, further comprising a portable wireless transceiver configured to communicate information describing the robot's environment to the robot manager.

6. The system of claim 5, wherein the robot manager uses information provided by the wireless transceiver to generate and update the map of the environment.

7. The system of claim 2, wherein the map of the environment includes a map of at least one of an office building; a warehouse; a shopping mall, a residential complex, and a house.

8. The system of claim 1, wherein the robot manager and the plurality of robots each include a Bluetooth communication subsystem.

9. The system of claim 1, wherein the robot manager further comprises an Internet communication subsystem configured to enable the robot manager to communicate with remote systems.

10. The system of claim 9, wherein the robot manager further comprises an application framework configured to download robot service function software from a remote system and to update the robot manager using the downloaded software.

11. The system of claim 9, wherein the robot manager further comprises an application framework configured to download robot service function software from a remote system and to provide enhanced or different functions to one or more of the plurality of robots using the downloaded robot service function software.

12. The system of claim 1, wherein multiple robots are configured to share the same information stored at the robot manager.

13. The system of claim 1, wherein multiple robots are configured to update similar information stored at the robot manager.

14. The system of claim 1, wherein the robot manager further comprises a scheduler configured to schedule operations of at least one robot from the plurality of robots.

15. The system of claim 1, wherein at least two robots from the plurality of robots are configured to communicate with each other.

16. The system of claim 15, wherein the at least two robots are configured to communicate with each other through the robot manager.

17. The system of claim 1, wherein the plurality of robots includes at least one of a cleaning robot, a security robot, and an entertainment robot.

18. A distributed multi-robot system, the system comprising:
- a plurality of robots configured to service an environment, each robot having a wireless communication module configured to communicate location and object information within the environment in conjunction with performance of a robot service function;
- a robot manager comprising a processor, a database, and a wireless communication module configured to wirelessly communicate with the plurality of robots, the robot manager further comprising:
  - a mapping and navigation module configured to automatically generate and update an electronic map of the environment from location and object information provided by one or more of the plurality of robots during performance of a service function within the environment;
  - an Internet communication subsystem configured to receive information and data used to monitor and control the plurality of robots via the Internet; and
  - an application framework configured to download robot service function software from a remote system and to update the robot manager using the downloaded robot service function software and to provide enhanced or different functions to one or more of the plurality of robots using the downloaded software; and
- a portable wireless transceiver configured to communicate information describing the environment to the robot manager,
- wherein the robot manager is configured to perform computationally intensive processing on behalf of a robot and wirelessly communicate the results and/or instructions therefrom to the robot for use in performance of a service function, wherein the processing required for performance of the service function is shared between the robot and the robot manager.

19. A method of controlling a plurality of robots in an environment, comprising:
- providing a plurality of robots configured to service an environment, each robot having a wireless communication module enabling wireless communication of location and object information within the environment;
- providing a robot manager comprising a processor, a database, and a wireless communication module that transmits and receives robot information and the robot manager communicating with each of a plurality of robots within the environment in conjunction with performance of one or more robot service functions, including:
  - receiving location and objection information from one or more of the robots, automatically updating a map of the environment, and wirelessly communicating the updated map to the plurality of robots; and
  - performing computationally intensive processing on behalf of a robot and then wirelessly communicating results and/or instructions therefrom to the robot; and
- the robot performing a service function using the results and/or instructions, wherein the processing required for performing the service function is shared between the robot and the robot manager.

20. The method of claim 19, further comprising the robot manager automatically generating the map of the environment within which the plurality of robots operate.

21. The method of claim 20, further comprising navigating at least one of the plurality of robots through the environment using the map.

22. The method of claim 19, further comprising scheduling operations of at least one robot from the plurality of robots using the robot manager.

23. The method of claim 19, further comprising downloading robot service function software from a remote system via the Internet and updating the robot manager using the downloaded robot service function software.

24. The method of claim 19, further comprising downloading robot service function software from a remote system via the Internet and providing enhanced or different functions to one or more of the plurality of robots using the downloaded robot service function software.

25. The method of claim 19, further comprising multiple robots sharing the same information stored at the robot manager.

26. The method of claim 19, further comprising multiple robots updating similar information stored at the robot manager.

27. The method of claim 19, further comprising at least two robots from the plurality of robots communicating with each other.

28. The method of claim 27, wherein the at least two robots communicate with each other through the robot manager.

29. The method of claim 19, further comprising communicating information describing the environment to the robot manager using a portable wireless transceiver.

* * * * *